United States Patent [19]

Gottlieb

[11] Patent Number: 5,255,591

[45] Date of Patent: Oct. 26, 1993

[54] FLUID POWERED INDEXING APPARATUS

[75] Inventor: Theodore Gottlieb, Laguna Niguel, Calif.

[73] Assignee: Nathan Gottlieb, West Bloomfield, Mich.

[21] Appl. No.: 770,318

[22] Filed: Oct. 3, 1991

[51] Int. Cl.⁵ ............ F01B 7/20; F01B 7/10; F16J 15/18

[52] U.S. Cl. .................. 92/52; 92/85 B; 92/53; 92/61; 92/65; 92/66; 92/117 R; 92/165 R; 92/165 PR; 92/166

[58] Field of Search ............ 92/51, 52, 53, 61, 62, 92/65, 66, 8, 85 B, 117 R, 165 R, 165 PR, 166, 85 A, 85 R; 91/170 R, 173, 174, 176, 196, 216 R, 217

[56] References Cited

U.S. PATENT DOCUMENTS

| | | | |
|---|---|---|---|
| 1,845,797 | 2/1932 | Kearney | 92/52 |
| 2,490,625 | 12/1949 | Hall | 91/217 |
| 2,605,750 | 8/1952 | Kupiec | 92/166 |
| 3,015,935 | 1/1962 | Evans | 92/52 |
| 3,236,620 | 2/1966 | Wiley | 92/117 R |
| 3,301,196 | 1/1967 | Glas | 91/217 |
| 3,371,583 | 3/1968 | Blatt | 92/61 |
| 3,452,397 | 7/1969 | Newton | 91/216 R |
| 3,892,279 | 7/1975 | Amtsberg | 92/85 B |
| 3,904,416 | 9/1975 | Onoda et al. | 92/65 |
| 3,994,539 | 11/1976 | Gottlieb | 384/49 |
| 4,881,211 | 11/1989 | Myers | 92/65 |

FOREIGN PATENT DOCUMENTS

| | | | |
|---|---|---|---|
| 2336066 | 2/1975 | Fed. Rep. of Germany | 91/173 |
| 0706555 | 12/1979 | U.S.S.R. | 92/85 B |

OTHER PUBLICATIONS

*Empress and Associates, Inc.* lifter catalogue Aug. 15, 1990.

*Primary Examiner*—Thomas E. Denion
*Attorney, Agent, or Firm*—Harness, Dickey & Pierce

[57] ABSTRACT

An indexing apparatus (10) having a pair of concentric cylinders (12, 14) with the outer concentric cylinder (12) being fixed against longitudinal movement and the inner cylinder (14) mounted for reciprocal movement relative to the fixed outer cylinder (12). A single ram piston (16) is mounted within the inner cylinder (14) and has a piston rod (18) connected to a member (29) for positioning at four predetermined positions. A shock absorber (24) is carried by the outer fixed cylinder (12) and engages stop plates or abutments (20, 28) carried by the inner cylinder (14) for activation of the shock absorber (24). A pair of guide rods (42) prevent rotational movement of inner cylinder (14) relative to the inner cylinder (12) and maintain the shock absorber (24) in axial alignment with the end abutments (20, 28). In one embodiment (FIGS. 9-11), guide rods (41A, 42A) have fluid passages (49A, 53A) in fluid communication with fixed ports (P5, P6) in the outer fixed cylinder (12A) for the supply of fluid to piston chambers (32A, 36A) in the reciprocable inner cylinder (14A).

11 Claims, 4 Drawing Sheets

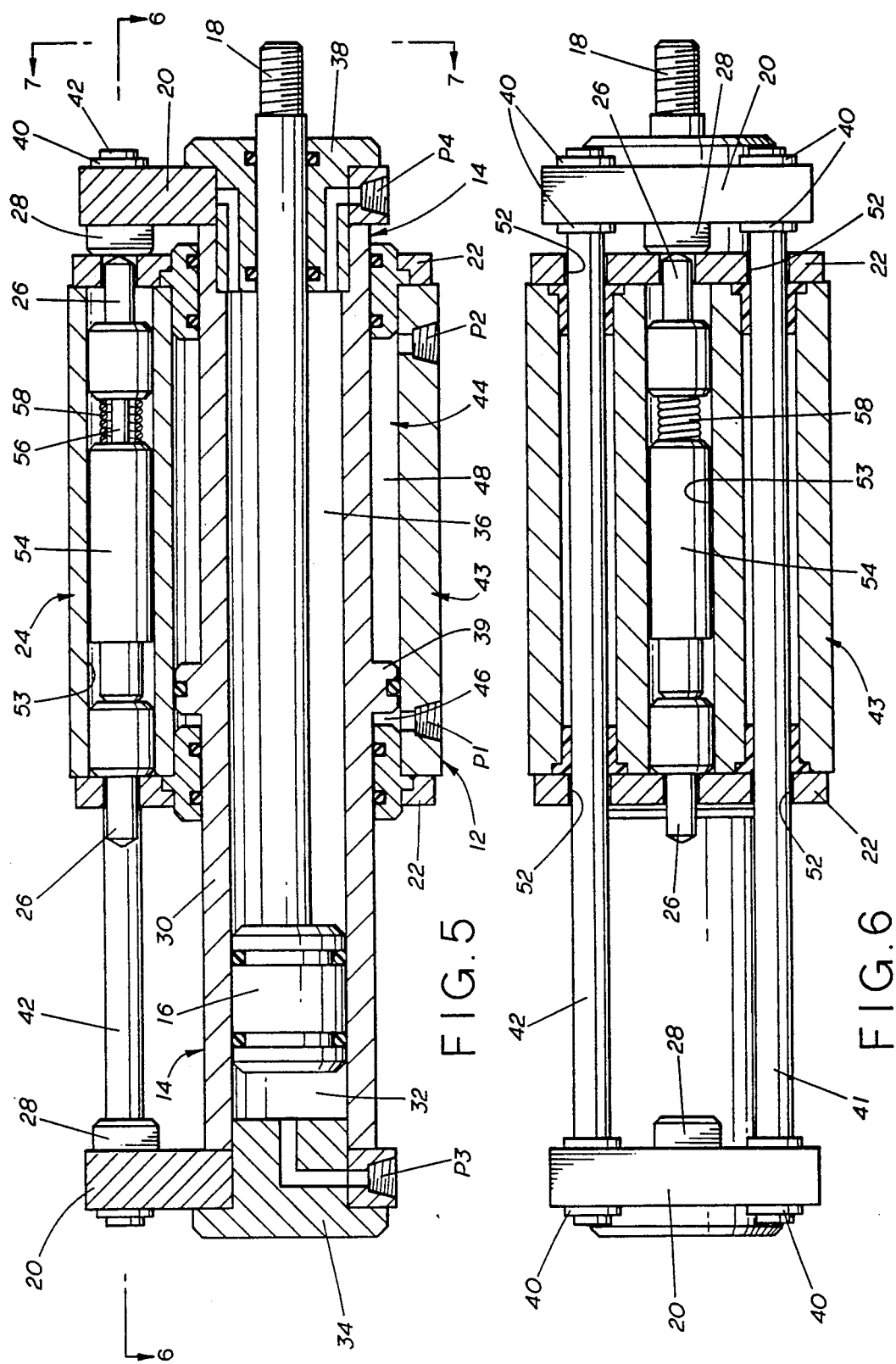

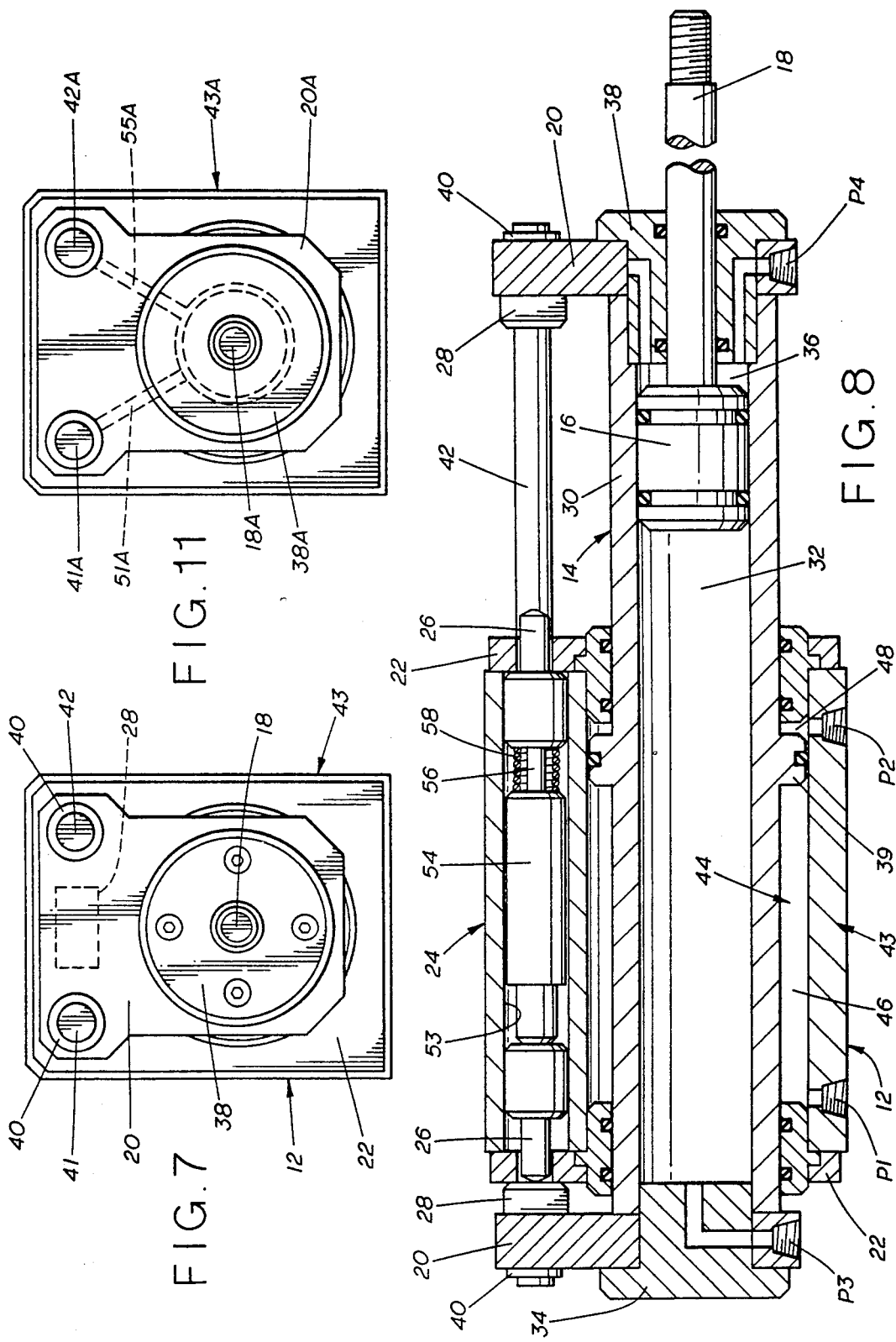

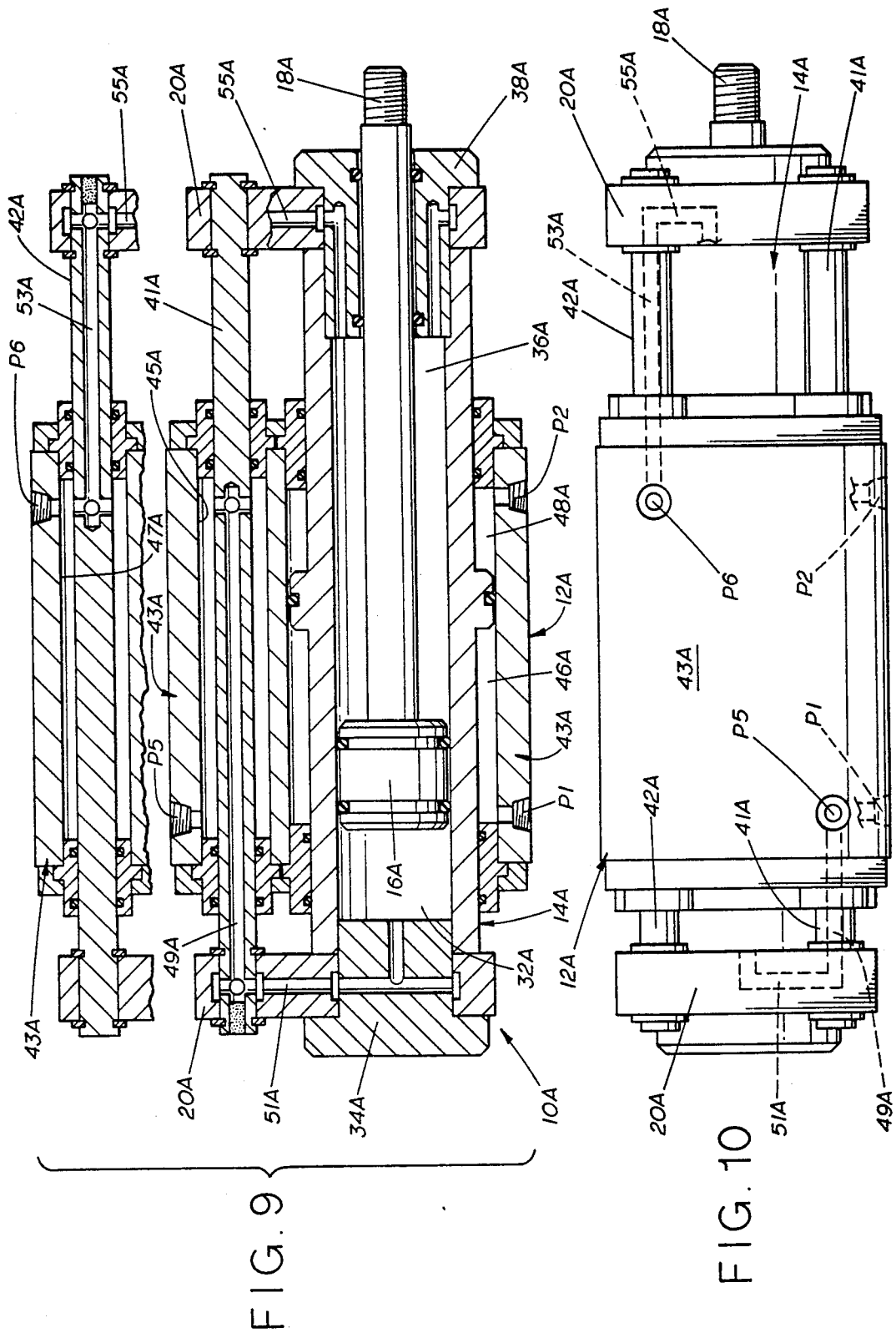

FLUID POWERED INDEXING APPARATUS

FIELD OF THE INVENTION

This invention relates to a fluid powdered indexing apparatus and more particularly to such an apparatus utilizing fluid operated cylinders for movement of the indexing mechanism.

BACKGROUND OF THE INVENTION

Indexing mechanisms powered by fluid cylinders have been used heretofore for providing indexing movements between predetermined indexing positions such as may be desirable for various types of slides, rotary tables, or lifting devices. For example, U.S. Pat. No. 3,994,539 dated Nov. 30, 1976 is directed to a self contained indexing apparatus in which a cylinder is mounted on a pair of hollow piston rods for sliding back and forth movement along the piston rods. The hollow piston rods define fluid passages to effect sliding movement of the cylinder or alternatively to provide sliding movement of the hollow piston rods relative to the cylinder. Such an arrangement provides a relatively short length indexing device which is highly desirable for fitting within limited space.

SUMMARY OF THE INVENTION

The present invention is directed particularly to a powered indexing apparatus or mechanism in which a pair of concentric cylinders are utilized to provide a powered movement of the indexing device. The inner concentric cylinder has an inner single ram piston therein with a piston rod fixed to the piston for movement therewith. The outer concentric cylinder is fixed against longitudinal movement and the inner concentric cylindrical is received within the outer fixed cylinder for relative back and forth reciprocal movement. Likewise, the single ram piston is mounted within the inner cylinder for reciprocable back and forth relative movement. Thus, by having three separate relatively movable members, the outer cylinder, the inner cylinder, and the inner single ram piston, two of the relatively movable members may be mounted for selective sliding movement relative to each other and relative to the third member which is fixed. As a result, a relatively short retracted length for the indexing device is provided and the indexing device of the present invention may be easily positioned in four separate predetermined positions.

A shock absorber to cushion the movement of the members at certain predetermined positions is carried by the outer fixed concentric cylinder, and guide means prevent relative rotational movement between the concentric cylinders to insure alignment of the shock absorber with stop members on the inner cylinder adjacent the end of each of the strokes for the predetermined positions.

In one embodiment, the ports for the inner reciprocable cylinder are mounted on the fixed outer cylinder so that fluid may be supplied and exhausted for the inner cylinder from rigid lines connected to the ports.

It is an object of this invention to provide an indexing apparatus utilizing concentric fluid cylinders which are pneumatically or hydraulically actuated for powering the apparatus among four selective linear positions.

It is a further object of this invention to provide a fluid operated indexing apparatus utilizing a pair of concentric fluid cylinder members and a single ram piston mounted within the inner concentric member so that the indexing mechanism may be positioned at four predetermined positions.

An additional object of this invention is to provide a indexing apparatus in which a shock absorber is provided to cushion the movement of the indexing mechanism at the end of the strokes for certain predetermined positions.

Another object of the invention is to provide a fluid operated indexing apparatus which requires no movable fluid hoses or lines for the fluid operation of the apparatus thereby to provide long life fluid lines.

Other features, objects, and advantages of this invention will become more apparent after referring to the following specification and drawings.

BRIEF DESCRIPTION OF THE DRAWINGS

FIG. 5 is a longitudinal sectional view of the indexing apparatus of the embodiment of this invention shown in FIGS. 1-4 and illustrating the position of the concentric cylinders and piston rod in the fully retracted position shown schematically in FIG. 1;

FIG. 6 is a section taken generally along line 6—6 of FIG. 5 and showing the shock absorber for cushioning the strokes of the indexing mechanism at the predetermined positions of the indexing mechanism;

FIG. 7 is an end elevation looking generally along line 7—7 of FIG. 5;

FIG. 8 is a longitudinal section similar to FIG. 5 but showing the inner concentric cylinder and piston in the full extended position of the piston rod as illustrated in FIG. 4;

FIG. 9 is a longitudianl sectional view of another embodiment of this invention in which fluid is supplied to the inner concentric cylinder from a pair of fluid ports in the fixed outer concentric cylinder through fluid passages in guide rods;

FIG. 10 is a top plan of the embodiment of the invention shown in FIG. 9; and

FIG. 11 is an end elevation of the embodiment shown in FIGS. 9 and 10.

DESCRIPTION OF THE INVENTION

Figure 1:
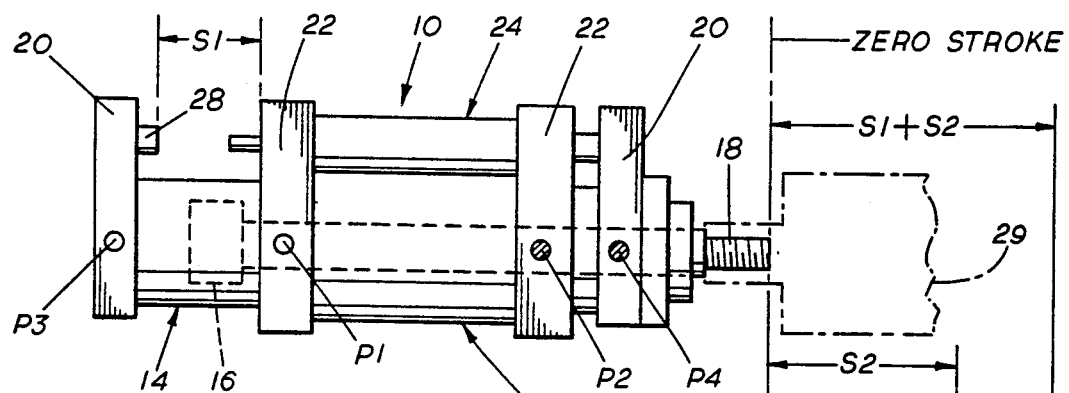
FIG. 1 is a schematic view of one embodiment of the indexing apparatus of this invention in a fully retracted position and including an outer fixed concentric cylinder and an inner reciprocable concentric cylinder including a single ram piston therein mounted for separate reciprocable movement relative to the outer fixed concentric cylinder among four predetermined positions.

Referring now to the embodiment of the invention shown particularly in FIGS. 1-8 and more particularly to the schematic views of FIGS. 1-4, the indexing apparatus or mechanism comprising the present invention is shown generally at 10. Indexing apparatus 10 includes a fixed outer concentric cylinder generally indicated at 12 and having fluid ports P1 and P2, and a movable inner concentric cylinder 14 having fluid ports P3 and P4. Inner cylinder 14 reciprocates back and forth relative to outer fixed cylinder 12. A single ram piston 16 is mounted within inner concentric cylinder 14 and has a piston rod 18 secured thereto and extending from an end of cylinder 14. A pair of end plates 20 are secured to opposed ends of inner concentric cylinder 14 and a pair of fixed end plates 22 are secured to fixed outer concentric cylinder 12. A shock absorber shown generally at 24 is secured to outer concentric cylinder 12 between end plates 22 and has opposed extending inwardly depressible actuating pins 26. Stops 28 on end plates 20 are adapted to engage pins 26 at each of the predetermined positions of cylinder 14.

Figure 2:
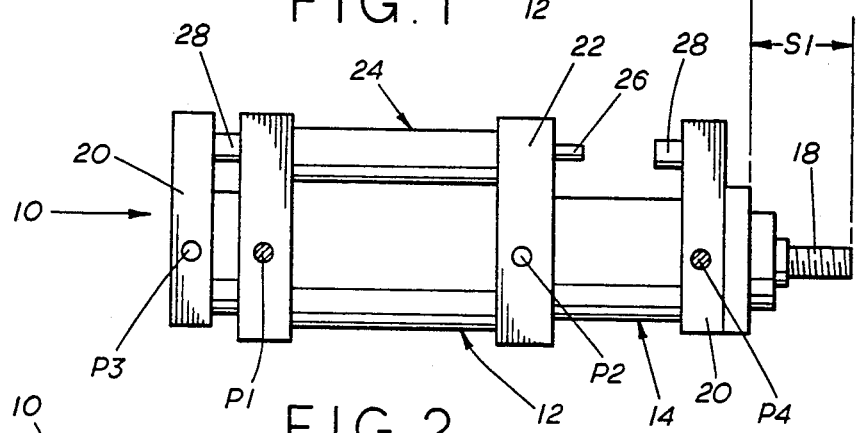
FIG. 2 is a schematic view similar to FIG. 1 but showing the inner concentric cylinder and extending piston rod in a second forward position shown by stroke S1.
Figure 3:
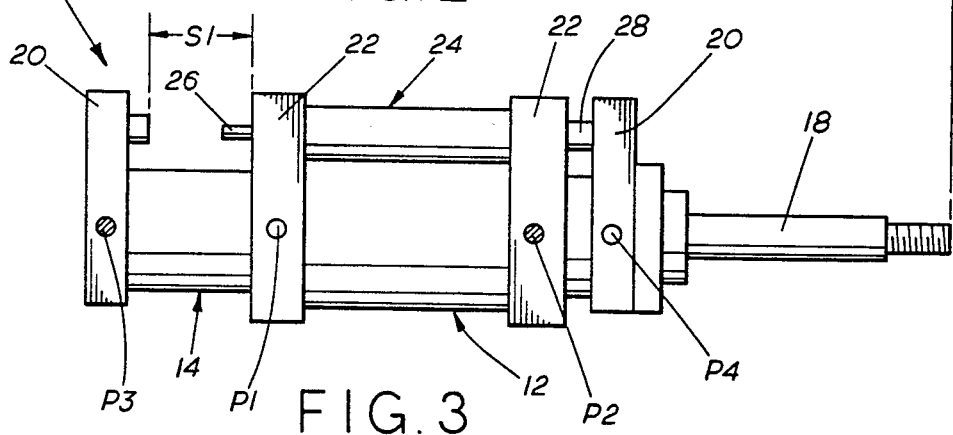
FIG. 3 is a schematic view of the embodiment of FIG. 1 in a third position showing the inner concentric cylinder and extending piston rod in a third forward position indicated by distance S2.
Figure 4:
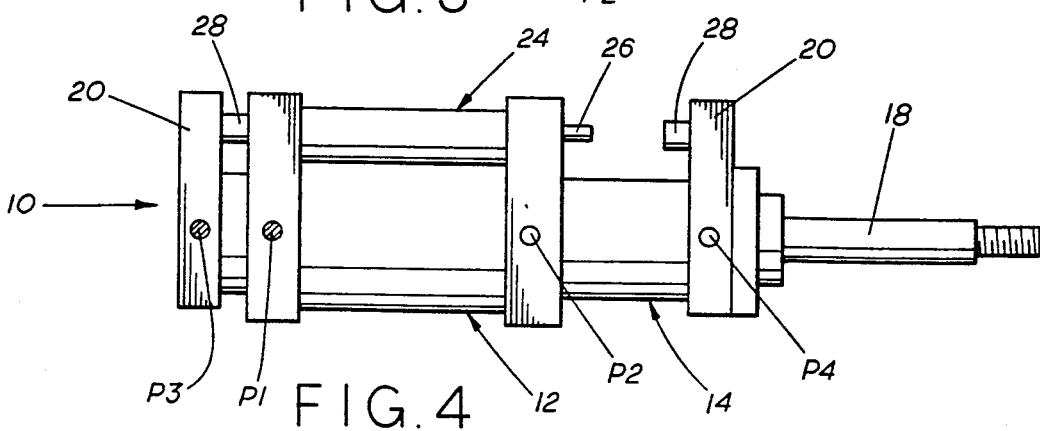
FIG. 4 is a schematic view of the embodiment of FIG. 1 in a fourth position of the piston rod indicated by the cumulative strokes S1 and S2.

FIGS. 1-4 indicate schematically the four predetermined positions for piston rod 18. Piston rod 18 has its extending end connected to various members for movement such as an indexing table shown diagrammatically at 29. FIG. 1 shows rod 18 and inner cylinder 14 at a first fully retracted position with fluid supplied through ports P2 and P4 and exhausted from ports P1 and P3. FIG. 2 at a second position shows rod 18 projected at a predetermined stroke S1 by extension of inner cylinder 14 with fluid supplied through ports P1 and P4 and exhausted from ports P2 and P3. FIG. 3 at a third position shows rod 18 projected at a predetermined distance or stroke S2 with fluid supplied through ports P2 and P3 and exhausted from ports P1 and P4. FIG. 4 at a fourth position shows rod 18 and inner concentric cylinder 14 projected a distance S1 and S2 with fluid supplied through ports P1 and P3 and exhausted from ports P2 and P4. Distance or stroke length S2 of rod 18 is of a maximum not greater than twice the distance or stroke length S1 of inner concentric cylinder 14. Inner concentric cylinder 14 acts as a shuttle as it moves back and forth relative to outer fixed cylinder 12. It is noted that at two of the four predetermined positions a stop 28 engages a pin 26 to move pin 26 inwardly for actuation of shock absorber 24 thereby to cushion the strokes of inner cylinder 14 as will be explained further.

Referring now particularly to FIGS. 5-8, the indexing apparatus 10 is illustrated in detail. Inner shuttle cylinder 14 has a cylindrical body 30 receiving single ram piston 16 to provide a piston chamber 32 adjacent end cap 34 and chamber 36 adjacent end bearing cap 38. A single ram piston is defined as a piston having a single piston rod extending from one end thereof as opposed to a double ram piston which has a piston rod extending from each end of the piston. Fluid is supplied and exhausted through port P3 for chamber 32 and supplied and exhausted through port P4 for chamber 36. Inner cylinder 14 has an integral piston 39 thereon. End plates 20 form abutments or stops for actuating pins 26 and have openings receiving guide rods 41 and 42 with retaining washers 40 securing rods 41, 42 on stop plates or abutments 20.

A body 43 of a rectangular cross section has a large diameter bore forming outer concentric cylinder 12. Outer cylinder 12 defines a cylinder chamber 44 receiving inner concentric cylinder 14 therein with piston 39 separating chamber 44 into chamber portion 46 in fluid communication with port P1 and chamber portion 48 in fluid communication with port P2. Rectangular end plates 22 have openings 52 receiving rods 41, 42 thereby to guide rods 42 and inner concentric cylinder 14 in a linear path without any rotational movement thereby to maintain pins 26 of shock absorber 24 in axial alignment with stops 28 on stop plates 20.

Body 43 defining outer fixed cylinder 12 has an upper small diameter bore 53 receiving shock absorber 24 as shown in FIG. 5. Shock absorber 24 has a fluid cylinder 54 with a fluid metering piston therein connected to rod 56. Inward depression of either of pins 26 by contact with an adjacent stop plate 20 pushes rod 56 inwardly with fluid metering in cylinder 54 resulting in cushioning the movement of inner concentric cylinder 14 at each of the four predetermined positions as shown schematically in FIGS. 1-4. Spring 58 returns pin 56 to its original projected position after cushioning.

In operation at the first predetermined position shown in FIG. 1, pressurized fluid is supplied through ports P2 and P4 to respective piston chambers 48 and 36 for urging inner cylinder 14 and single ram piston 16 to the left as viewed in FIG. 1. Fluid is exhausted from chamber 46 through port P1 and exhausted from chamber 32 through port P3. The right stop plate 20 engages actuating pin 26 to actuate shock absorber 24 at the end of the stroke.

For movement to the second predetermined position shown in FIG. 2, pressurized fluid is supplied through port P1 to chamber 46 to move inner cylinder 14 along with piston 16 to the right as viewed in FIG. 2 and pressurized fluid through port P4 to chamber 36 maintains piston 16 in retracted position within inner cylinder 14. In this position, the left plate 20 engages pin 26 for actuation or shock absorber 24 to cushion any impact of stop plate 20 at the end of the stroke S1 of inner cylinder 14.

For movement to the third predetermined position shown in FIG. 3, fluid is supplied through port P2 to chamber 48 for movement of inner cylinder 14 to the left as viewed in FIG. 3 and pressurized fluid is supplied through port P3 to chamber 32 to move piston 16 to the right as viewed in FIG. 3 with piston rod 18 projecting a total distance indicated by stroke S2. In this position, the right stop plate 20 engages actuating pin 26 for activating shock absorber 24 at the end of the stroke for the third predetermined position.

For movement to the fourth predetermined position shown in FIG. 4, pressurized fluid is supplied through port P1 to move inner cylinder 14 to the right and pressurized fluid is supplied through port P3 to chamber 32 to maintain piston 18 in the projected position thereof with piston rod 18 being projected a total distance of strokes S1 and S2. Fluid is exhausted from chamber 48 through port P2 and exhausted from chamber 36 through port P4. The left stop plate 20 engages pin 26 for activation of shock absorber 24 to cushion the end of the stroke at the fourth predetermined position. The indexing mechanism may be returned to the position of FIG. 1 by the supply of pressurized fluid through ports P2 and P4 as indicated above for the first predetermined position. It is to be understood that suitable fluid hoses or lines (not shown) are connected to ports P1, P2, P3, and P4 and extend to a suitable hydraulic fluid pump and reservoir as well known. Since inner cylinder 14 reciprocates back and forth, flexible fluid lines would normally be connected to ports P3 and P4 for movement with inner cylinder 14.

Referring now to FIGS. 9-11, a further embodiment of this invention is shown in which all of the external ports for connection to the fluid lines for supplying and exhausting fluid for the inner and outer concentric cylinders are positioned on the fixed outer cylinder thereby eliminating any requirement for movable hoses or other flexible lines to be connected to the indexing apparatus. Thus, no space is required for movable lines as would be required in the event flexible hoses or lines are connected directly to the inner movable cylinder.

Indexing apparatus 10A includes fixed outer concentric cylinder 12A having ports P1 and P2 therein for the supply and exhaust of fluid to respective fluid chamber 46A and 48A as in the embodiment of FIGS. 1-8. Rectangular body 43A of outer cylinder 10A has ports P5 and P6 therein in fluid communication with respective bores 45A and 47A in body 43A. Guide rod 41A is mounted within bore 45A and guide rod 42A is mounted within bore 47A. Fluid is supplied to piston chamber 32A in inner movable cylinder 14A through port P5 to bore 45A, then through fluid passage 49A in rod 41A, and next through fluid passage 51A in end plate 20A and end cap 34A to fluid chamber 32A. Fluid is exhausted from piston chamber 32A in reverse order.

Fluid is supplied to piston chamber 36A in inner movable cylinder 14A through port P6 to bore 47A, then through fluid passage 53A in rod 42A, and next through fluid passage 55A in end plate 20A and end bearing cap 38A to fluid chamber 36A. Fluid is exhausted from piston chamber 36A in reverse order. Rigid fluid lines or piping may be connected to ports P5 and P6 for the supply and exhaust of fluid for inner movable cylinder 14A. Piston 16A is mounted within piston chambers 32A and 36A and piston rod 18A extends outwardly from inner concentric cylinder 14A as in the embodiment of FIGS. 1-8.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. An indexing apparatus comprising:
   a pair of concentric fluid cylinders defining an outer cylinder of a relative short length receiving an inner concentric cylinder of a relative long length extending from opposed ends of said outer cylinder, said inner cylinder having a piston received within said outer cylinder to separate said outer cylinder into a pair of piston chambers;
   said outer concentric cylinder being fixed against longitudinal movement and said inner concentric cylinder being mounted for back and forth longitudinal movement relative to said outer cylinder;
   a single ram piston mounted within said inner concentric cylinder for reciprocal back and forth movement relative to said inner concentric cylinder and defining a pair of piston chambers therein adjacent opposite ends of said piston;
   a piston rod secured to one end of said piston and extending from an end of said inner cylinder;
   means operatively connected to the extending end of said piston rod for positioning at a plurality of predetermined positions;
   a shock absorber carried by said fixed outer concentric cylinder;
   means adjacent the ends of the strokes of said inner cylinder to activate said shock absorber to cushion the longitudinal movement of said inner cylinder at the end of its strokes; and
   means to prevent rotative movement of said inner cylinder relative to said outer fixed cylinder during reciprocable movement of said inner cylinder relative to said outer cylinder;
   said means to prevent rotative movement of said inner cylinder comprising a pair of abutments on opposed ends of said inner cylinder, and a rod extending between and secured to said abutments, said outer cylinder having means receiving said rod for maintaining the travel of said inner cylinder in a longitudinal direction and preventing rotative movement of said inner cylinder relative to said outer cylinder.

2. An indexing apparatus as set forth in claim 1 wherein said abutments provide stops for contacting said outer cylinder and limiting the longitudinal movement and stroke of said inner cylinder.

3. An indexing apparatus as set forth in claim 2 wherein said means to activate said shock absorber include a pair of opposed depressible pins on opposed ends of said shock absorber for contacting said abutments at the end of the strokes of said inner cylinder at said predetermined positions to cushion the impact of said inner cylinder against the abutments.

4. An indexing apparatus as set forth in claim 2 wherein a pair of ports are provided on said outer fixed cylinder for the supply of fluid to said inner cylinder, said ports adapted for connection to fixed rigid fluid supply lines for the supply and exhaust of fluid for the reciprocal movement of said inner cylinder.

5. An indexing apparatus as set forth in claim 4 wherein said outer fixed cylinder has a separate fluid chamber in fluid communication with each of said ports, and a pair of slidable members carried by said reciprocable inner cylinder are received within said separate fluid chambers; and
   fluid passages in said slidable members communicate fluid between said separate fluid chambers and said pair of piston chambers of said inner cylinder for the supply and exhaust of fluid for said inner cylinder piston chambers.

6. An indexing apparatus as set forth in claim 5 wherein said pair of slidable members comprise a pair of rods having fluid passages therein; and
   said pair of abutments on opposed ends of said inner cylinder secure the ends of said rods to mount said rods for movement with said inner cylinder.

7. An indexing apparatus comprising:
   a pair of concentric fluid cylinders defining an outer cylinder of a relatively short length receiving an inner concentric cylinder of a relatively long length extending from opposed ends of said outer cylinder, said inner cylinder carrying a piston received within said outer cylinder to separate said outer cylinder into a pair of piston chambers;
   a piston mounted within said inner concentric cylinder and defining a pair of piston chambers therein adjacent opposed ends of said piston;
   guide means between said inner cylinder and said outer cylinder to permit relative reciprocable movement between said inner and outer cylinders and preventing relative rotative movement between said inner and outer cylinders;
   said inner concentric cylinder having an abutment adjacent each end of said outer concentric cylinder to provide opposed longitudinally aligned abutments, and a rod secured to the opposed abutments, said outer cylinder having means receiving said rod for maintaining the travel of said inner cylinder in a longitudinal direction and preventing relative movement of said inner cylinder relative to said outer cylinder;

an elongate shock absorber mounted on said outer concentric cylinder between said abutments and having a depressible plunger-type member extending from each end of the shock absorber for activating the shock absorber when inwardly depressed, one of the plunger-type members contacting said associated adjacent abutment at each end of a stroke between said inner and outer concentric cylinders for cushioning of said stroke.

8. An indexing apparatus as set forth in claim 7 wherein a guide rod is secured between said abutments for longitudinal movement with said inner cylinder, and said outer cylinder receives said guide rod to prevent relative rotative movement between said inner and outer cylinders to maintain axial alignment of said abutments and said depressible plunger-type members for activating said shock absorber.

9. An indexing apparatus movable between a plurality of predetermined positions and comprising:

a pair of concentric fluid cylinders defining an outer cylinder of a relatively short length receiving an inner concentric cylinder of a relatively long length extending from opposed ends of said outer cylinder, said inner cylinder carrying a piston received within said outer cylinder to separate said outer cylinder into a pair of piston chambers;

said outer cylinder being fixed against longitudinal movement and said inner concentric cylinder being mounted for back and forth longitudinal movement relative to said outer cylinder;

a piston mounted within said inner cylinder for relative reciprocable movement and separating said inner cylinder into a pair of piston chambers;

a first pair of fluid ports in said outer cylinder to supply and exhaust fluid for the piston chambers of said outer cylinder;

a second pair of fluid ports in said outer cylinder to supply and exhaust fluid for the piston chambers of said inner cylinder during reciprocable movement of said inner cylinder relative to said outer cylinder, said second pair of fluid ports adapted to be connected to a pair of rigid fluid lines for the supply and exhaust of fluid for said piston chambers of said inner cylinder; and a body of a generally rectangular shape having a large diameter central bore for defining said outer fixed cylinder and a pair of small diameter bores for defining a pair of small diameter fluid chambers, and a pair of rods carried by said inner cylinder are received within said small diameter fluid chambers of said outer fixed cylinder and have fluid passages in fluid communication with said piston chambers of said inner cylinder to supply said inner cylinder piston chambers with fluid.

10. An indexing apparatus as set forth in claim 9 wherein an abutment is mounted on said inner cylinder adjacent each end of said outer cylinder, and said rods are secured to the abutments.

11. An indexing apparatus as set forth in claim 10 wherein a shock absorber is mounted on said outer cylinder between said abutments and has opposed actuating members on opposite ends thereof, one of said actuating members contacting said adjacent abutment at the end of each stroke of said inner cylinder to activate said shock absorber for cushioning the impact of said inner cylinder against said outer cylinder at each of the predetermined positions.

* * * * *